2,871,256

METHOD OF PREPARING TEREPHTHALIC ACID ESTERS FROM α,α,α,α',α',α'-HEXACHLORO-p-XYLENE

Owen D. Ivins and James D. Head, Midland, Mich., assignors to The Dow Chemical Company, Midland, Mich., a corporation of Delaware No Drawing. Application March 2, 1956
Serial No. 568,984

8 Claims. (Cl. 260—475)

This invention relates to an improved method of preparing aromatic esters and particularly to preparing diesters of terephthalic acid. Especially it relates to the preparation of such diesters from α,α,α,α',α',α'-hexachloro-paraxylene and an alcohol in the presence of a Friedel-Crafts type catalyst.

Esters of terephthalic acid, sometimes called benzene-para-dicarboxylic acid, are well known. They are of high commercial value. For example, dimethylterephthalate is of extreme importance as an intermediate in the production of polyethyleneterephthalate, a high molecular weight fiber-forming copolymer. The substantially pure diester is prepared and reacted with ethylene glycol to give the fiber-forming polymer.

The preparation of the diester by direct esterification, i. e. reacting the acid with an alcohol, has been accompanied by a number of difficulties. Attempts to overcome these difficulties have been but partially satisfactory from a commercial point of view. Because of the high melting point of the acid and its insolubility in alcohol, it has heretofore been found necessary to resort to elevated temperatures, superatmospheric pressure, excessive amounts of the alcohol, and high molar ratios of sulfuric acid to obtain the diester. The rate of reaction and the need for purifying the product have made the direct reaction costly. Dibutylterephthalate has been prepared by reacting n-butyl alcohol with terephthalic acid at 25–500 atmospheres' pressure at 225°–350° C. using zinc borate, zinc oxide, or lead oxide as catalyst. Only between about 60% and 65% yield of dibutylterephthalate based upon the theoretical yield, calculated on the acid used, was obtained.

Other attempts have consisted of making a slurry of the terephthalic acid in a high boiling liquid, preferably another aromatic diester such as dimethylphthalate, and passing vaporous alcohol therethrough while maintaining a temperature above the boiling point of the alcohol. It is possible by another multiple step method to prepare the diester by oxidizing para-xylene to toluic acid, esterifying the toluic acid with an alcohol to the alkyl toluate halfester, further oxidizing the halfester to the halfester of terephthalic acid, and then esterifying again with additional alcohol to form the diester of terephthalic acid.

It is known that benzotrichloride reacts with an alcohol in the presence of zinc chloride or ferric chloride to form an ester of benzoic acid; the other products of the reaction are thought to be hydrochloric acid, the alkyl chloride and/or benzoyl chloride (German Patents Nos. 11,494 and 472,422).

An object of the present invention is to provide an improved method of directly preparing aliphatic diesters of terephthalic acid. A further object is to provide a method of preparing such diesters in a single step by reacting the appropriate alkyl alcohol with hexachloroxylene. Another object is to provide a method of preparing such diesters by carrying on the reaction in the presence of a Friedel-Crafts type catalyst, and particularly in the presence of zinc chloride.

It is preferred to limit the application of the invention to the preparation of terephthalic acid diesters formed by reacting α,α,α,α',α',α'-hexachloro-para-xylene with an aliphatic primary alcohol of from 1 to 6 carbon atoms. Hexachloro-ortho-xylene is not readily available because of the difficulty encountered in its preparation, which is likely due to steric hindrance existing in attempting to substitute chlorine for the sixth hydrogen atom in the adjacent methyl groups. The invention is therefore not directed toward forming the ortho-diesters, i. e. esters of phthalic acid. When the hexachloro-meta-xylene is used with an alcohol of 1 and 2 carbon atoms, poor yields of relatively impure diesters of the isophthalic acid can be obtained; higher alcohols give yet poorer yields and permit more side reactions.

We have unexpectedly found that when both methyl groups of para-xylene have been completely chlorinated, the resulting hexachloro-para-xylene may be reacted with a primary aliphatic alcohol to form the corresponding alkyl diester of terephthalic acid and alkyl chloride. We have also found that the presence of a Friedel-Crafts type catalyst appreciably aids the rate of reaction and the purity of the diester.

By a Friedel-Crafts type catalyst is meant that type of catalyst introduced by Friedel and Crafts in Comp. rend. de l'académie des sciences, Paris, 84, 1392, 1450 (1877) and rather fully discussed by C. C. Price in Organic Reactions, III, 2–19 (1947) and in Fieser and Fieser, Organic Chemistry, 2nd ed., 573 (1950). They are acid catalysts which are thought to promote a redistribution of charges within a reacting group and thus to orient advantageously the reactive positions thereon. Prominent among the Friedel-Crafts catalysts are the oxides and halides of metalloids and of metals having amphoteric properties.

In practicing the invention a molar excess of the alcohol is desirable at all times. The reaction is best carried on under anhydrous or substantially anhydrous conditions. However, the presence of water, up to as much as 40% by weight of an alcohol-water mixture, does not appear to seriously retard the reaction rate or impair the products formed. The quantitative molar ratio for the reaction is 8 of the alcohol to 1 of the hexachloro-para-xylene, as shown by the equation:

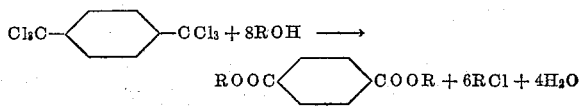

where R is an alkyl radical of 1 to 6 carbon atoms. Although the reaction can be carried on at the stoichiometric ratio, it is recommended that the alcohol be present in the amount of at least 9 to 1 mole of the chlorinated xylene, and preferably in considerably greater excess. At the beginning of the reaction an excess, say of two moles over the stoichiometric requirement, that is 10 to 1, is a sufficient ratio at that time; but as the reaction proceeds and the available chlorinated methyl groups for reacting become reduced in number, an excess over the stoichiometric requirement, of 4 to 12 moles, is preferable; that is to say, a ratio of 12 to 20 moles of alcohol to 1 mole of the chlorinated xylene, is recommended.

Although the reaction is exothermic, some external heat can be advantageously applied throughout the reaction; it is therefore not necessary to withhold any alcohol at the beginning or to feed it gradually because of any danger that the reaction may generate temperatures above the limits of safety. There is no critical upper limit on the proportion of alcohol required to be present at any time. In other words, all of the alcohol considered desirable may be present at the beginning of the reaction or mere excess may be present at the beginning of the reaction and further additions of alcohol made while the reaction is in process. Although an excess of alcohol of over 20 moles to 1 mole of the chlorinated xylene may be used, such excess usually results in extra material and handling costs and prolongs the final separation of the end product unnecessarily. On the other hand, if less than the stoichiometric quantity of alcohol is present during the reaction, the diester is produced in the form of a crystallized mass which tends to char because of the absence of unreacted alcohol to act as a heat transfer medium. It is also helpful to have present at the close of the reaction enough unreacted alcohol to make a sufficiently fluid slurry for convenient filtering. When 10 to 12 moles of alcohol per mole of xylene are used, the reacted mixture tends to be a bit too viscous whereas when 14 to 20 moles of alcohol per mole of xylene are used, the reacted mixture is easily filtered.

Although the reaction may be carried on at a temperature of between 65° and 140° C. in a flask or boiler equipped with a reflux condenser or rectifying column without the aid of a catalyst, the presence of a Friedel-Crafts type catalyst reduces the time of reaction within the same temperature range and improves the quality of the dialkyl terephthalate formed.

Zinc chloride has been found to be the most effective catalyst for the reaction. Among other catalysts which have been found to be effective are zinc bromide, stannic chloride, aluminum chloride, nickel chloride, cobalt chloride, ferric chloride, mercuric chloride, cadmium chloride, sulfuric acid, benzene sulfonic acid, and para-toluene sulfonic acid. These catalysts, however, require a longer reaction time than does zinc chloride. The amount of catalyst used varies with the alcohol used and the temperature. A weight percent of catalyst based upon the hexachloro xylene may be varied between 10 percent and 30 percent. Less than 10 percent catalyzes the reaction, but results in a slow reaction and over 30 percent results in an unjustified material and operating expense.

The alcohols suitable for this reaction are all monohydric primary aliphatic alcohols having 1 to 6 carbon atoms; both saturated and unsaturated alcohols are effective reactants. Such saturated alcohols as methanol, ethanol, propanol, butanol, isobutanol and hexanol and such unsaturated alcohols as allyl have been used.

Methanol, generally, is the most suitable alcohol from the standpoint of performance and cost, as well as from the standpoint of demand for the side product, methyl chloride. Methyl chloride which is formed along with the diester is a highly valuable commodity, which is in demand in a wide number of processes for example those requiring blowing agents and circulating coolants. Methanol, ethanol, and normal propanol give substantially quantitative yields; however, the alcohols of 4–6 carbon atoms give slightly lower percent yields. Heptanol and higher alcohols produce appreciable amounts of hydrochloric acid.

In addition to obtaining good yields of terephthalic diesters of high purity in a relatively fast reaction, our method does not produce hydrochloric acid in measurable quantities as one of the end products. Hydrochloric acid aggravates the corrosive nature of the reacting mixture and of the raw end-products and requires an additional purification step, whereas the additional alkyl halide which is produced according to our invention does not add to the corrosive nature of the mixture, is easily volatilized off, and is a commercially salable product.

The invention may be practiced by placing hexachloroxylene and one or more lower aliphatic alcohols in a vessel and heating at atmospheric pressure, to form diesters of terephthalic acid. The invention is preferably carried out by heating a reaction mixture of $\alpha,\alpha,\alpha,\alpha',\alpha',\alpha'$-heachloro-para-xylene and a primary aliphatic alcohol, having from 1 to 6 carbon atoms therein, in the ratio of 1 mole of the hexachloroxylene to 12–20 moles of the alcohol in the presence of a Friedel-Crafts catalyst, e. g. zinc chloride, between the refluxing temperature of the mixture and 145° C. for a time sufficient to substantially complete the reaction resulting in the formation of the corresponding dialkyl terephthalate and alkyl chloride from the reaction mixture.

Although the preferred range within which the reaction herein described goes best, lies, as stated, between the refluxing temperature and 145° C. the temperature need not be held constant and may be extended to temperatures below the refluxing temperature and above 145° C. without defeating the objects of the invention. However, the reaction at a temperature below the refluxing temperature tends to go too slowly and at a temperature above 145° C. to encourage undesirable side reactions.

Atmospheric pressure is entirely satisfactory for this reaction. It is to be understood, however, that when the temperature of the reaction is above the boiling point of the alcohol, a closed vessel is used which provides an increased pressure due to the autogenic pressure created by the reaction. Increased pressure, whether caused by autogenic pressure or by special apparatus, may be employed in the reaction.

The principles of the invention are made manifest by the series of examples set forth hereinafter. The examples are illustrative only and are not intended to define the limits of the invention. $\alpha,\alpha,\alpha,\alpha',\alpha',\alpha'$-hexachloro-para-xylene was used in all examples and is referred to merely as hexachloro-para-xylene.

Series 1 consisting of Examples 1 through 12 illustrates the effect of the choice of catalyst on the rate of reaction and upon the quality of the diester produced. No catalyst was used in Example 12. In each of the other examples of the series, a different catalyst was used. The salient findings of each example are tabulated in Table I following Series 1.

SERIES 1

*Example 1*

A quantity of 100 g. (0.32 mole) of the hexachloro-para-xylene was placed in a ½ liter round bottom flask fitted with a reflux condenser. The condenser was topped by a line leading into a Dry Ice-acetone trap to collect the methyl chloride. To the hexachloro-para-xylene was added 150 cc. (3.7 moles) methanol and 15 g. anhydrous zinc chloride. This mixture was heated to the refluxing temperature (66° C.) and a visual observation made during the course of the reaction. Approximately one-half of the hexachloro-para-xylene was insoluble in this volume of alcohol. However, as the reaction progressed, the solid hexachloro-para-xylene gradually dissolved and an oily layer formed in the bottom of the flask. After a few hours of continuous refluxing, a white leaflet crystalline solid began separating from the alcohol layer while the oil layer showed a definite decrease in volume. The reaction was allowed to continue and finally shut down at the end of 30.5 hours of continuous refluxing. The reaction mixture was suction filtered to collect the crystalline product. The filter cake was slurried in water, refiltered, and washed with water until the filtrate did not show chloride ion. 58.5 g. of dried product were obtained, M. P. 138°–140° C., this was a 94.5% yield based upon the chlorinated xylene. 84.5 g. of methyl chloride were recovered, a yield of 87% based upon the chlorinated xylene.

The melting point of chemically pure dimethyl terephthalate is 140–141° C. (C. R. Handbook).

*Example 2*

Example 1 was repeated except 27 g. of ferric chloride were added as a catalyst in place of the zinc chloride and the reflux time was 46 hours.

Example 3

Example 1 was repeated except 15 g. of mercuric chloride were used in place of the zinc chloride and the reflux time was 51.5 hours.

Example 4

Example 1 was repeated except that 15 g. of cadmium chloride were used as the catalyst and the reflux time was 48 hours.

Example 5

Example 1 was repeated except 30 g. of stannic chloride were used as the catalyst and the reflux time was 75 hours.

Example 6

Example 1 was repeated except 200 ml. (4.94 moles) of methanol were used, 15 g. of cobalt chloride were used as the catalyst, and the reflux time was 31.25 hours.

Example 7

Example 1 was repeated except 15 g. of nickel chloride were used as the catalyst and the reflux time was 222 hours.

Example 8

The procedure was the same as in Example 1 except 30 g. of sulfuric acid were used as the catalyst and the reflux time was 86.5 hours.

Example 9

Example 1 was repeated except that 200 ml. (4.94 moles) of methanol were used; 15 g. of zinc bromide were added as a catalyst, and the reaction time was 72 hours.

Example 10

Example 1 was repeated except 200 ml. (4.94 moles) of methanol were used; 30 g. of benzene sulfonic acid were added as a catalyst, and the reaction time was 99 hours.

Example 11

Example 1 was repeated except 200 ml. (4.94 moles) of methanol were used, 30 g. of para-toluene sulfonic acid were added as a catalyst, and the reaction time was 99.5 hours.

Example 12

In this example, the procedure of Example 1 was followed but no catalyst at all was used and the reflux time was 184.5 hours. There was some evidence of terephthalic acid and/or monomethyl terephthalate having been formed, based upon the presence of an oily solid of a high melting point which amounted to 1½ percent.

Series 1 has demonstrated the effect of using a Friedel-Crafts catalyst and the comparative effects obtained when different Friedel-Crafts catalysts are used. These effects are set out in tabulated form immediately below.

TABLE I.—TYPE OF CATALYST VARIED

| Example | Catalyst | Percent Catalyst Based on Xylene | Time, Hours | Dimethyl Terephthalate | | Methyl Chloride, Percent Yield |
|---|---|---|---|---|---|---|
| | | | | Percent Yield [1] | M. P.° C. | |
| 1 | ZnCl$_2$ | 15 | 30.5 | 94.5 | 138–140 | 87.1 |
| 2 | FeCl$_3$ | 27 | 46 | 96 | 139–140.5 | 79.4 |
| 3 | HgCl$_2$ | 15 | 51.5 | 93.5 | 137–140 | 55.2 |
| 4 | CdCl$_2$ | 15 | 48 | 93 | 135–139 | [3] |
| 5 | SnCl$_4$ | 30 | 75 | 92 | 140–141 | 74.2 |
| 6 | CoCl$_2$ | 30 | 31.25 | 97 | 139.5–140.5 | 92.5 |
| 7 | NiCl$_2$ | 15 | 222 | 76 | 137–140 | 66.5 |
| 8 | H$_2$SO$_4$ | 30 | 86.5 | 89 | 136–139 | [3] |
| 9 | ZnBr$_2$ | 15 | 72 | 89.5 | 130–137 | [3] |
| 10 | C$_6$H$_5$SO$_3$H | 30 | 99 | 99.2 | 132–137 | 92.5 |
| 11 | CH$_3$C$_6$H$_4$SO$_3$H | 30 | 99.5 | 97.5 | 137–140 | 90 |
| 12 | None | | 184.5 | 76.5 | [2] 130–137 | 46 |

Although the temperature was generally that of the reflux temperature of methanol, i. e. about 66° C., in all runs the temperature was permitted to rise to as high as 80° C. toward the latter part of the runs.

[1] Percent yields are based upon stoichiometric yield which was theoretically possible based upon the hexachloroxylene used.

[2] A small amount of terephthalic acid and/or monomethyl terephthalate appeared to be present in the product.

[3] Percent yield of methyl chloride was not determined.

It can be readily seen by an examination of Table I that the purity of the product, as shown by the melting points and by the rate of reaction as shown by the time required for the different catalysts, that zinc chloride is definitely superior to the other catalysts used. Furthermore, it can be seen that para-toulene sulfonic acid and the chlorides of cobalt, iron, mercury, cadmium and tin gave good results, but that nickel chloride gave a result which was inferior to the other catalysts used. In the reaction in which no catalyst was used, dimethylterephthalate was formed but the reaction time was longer and the product was somewhat less pure. Although it can be purified, the additional purification and the length of time of reaction make it preferable to conduct the reaction in the presence of a catalyst.

SERIES 2

In order to reduce the reaction times which were shown to be required in Series 1 at a temperature of 66° C., Examples 13 through 17 of this series were run at advanced temperatures; otherwise the procedure of Series 1 was generally followed. A series of runs, Examples 13 through 17, shown in Table II, were made in Carius tubes (17 x 22 x 700 mm. Pyrex glass), each run consisting of the following size charge; 10 g. (0.032 mole) of the hexachloro-para-xylene, 16 g. (0.5 mole) methanol, and 1.5 g. anhydrous zinc chloride. The tubes were sealed and heated in a furnace for the required time, removed, cooled in Dry Ice, then opened and allowed to warm to room temperature. As the contents warmed the evolved gas was checked for the presence of hydrochloric acid. The contents were washed out with methanol and evaporated to dryness on a steam bath. The residues were then washed with water to remove zinc chloride, dried, and assayed for dimethylterephthalate by infra-red spectrophotometry.

Table II shows the results obtained in Series 2 in which the examples were run at various temperatures. Note that a temperature of 140° C. gave the best results.

TABLE II.—TEMPERATURE VARIED

| Example | Temp., °C. | Time, Hours | Mole percent DMT[1] by Infrared Analysis | M. P., °C. | Presence of HCl |
|---|---|---|---|---|---|
| 13 | 140 | 1 | 99 | 137–139 | (−) |
| 14 | 150 | 1 | 95 | Mainly 135–138 | (+) |
| 15 | 180 | 1 | 92 | Mainly 134–138 | (+) |
| 16 | 160 | 1 | 82 | Mainly 134–136 | (+) |
| 17 | 120 | 2 | [2]70 | Mainly 120–130 | (−) |

[1] DMT—dimethylterephthalate.
[2] Analysis showed a presence of 5% unreacted hexachloro-para-xylene.

Series 2 shows that excellent results were obtained in a run of 1 hour at 140° C. It shows that at 120° C., the reaction was not sufficiently complete at the end of even 2 hours to justify stopping the reaction at that time. On the other hand, temperatures of 150° and particularly 160° and 180° C. indicated side reactions resulting in the formation of undesirable end products together with the diester.

SERIES 3

To ascertain the optimum percent of catalyst to be used in the reaction, varying weight percents of zinc chloride based upon the hexachloroxylene were used in Examples 18 to 22 of this series are shown in Table III. The reaction was run at 140° C. for one hour. The procedure was otherwise similar to that employed in Series 1.

TABLE III.—CATALYST CONCENTRATION VARIED

| Example | ZnCl$_2$, Percent by Weight | Infrared Analysis | | M. P., °C. | Presence of HCl |
|---|---|---|---|---|---|
| | | Mole Percent DMT | Mole Percent HCX-p | | |
| 18 | 0 | 22 | ca. 60 | (1) | (+) |
| 19 | 2.5 | 35 | ca. 30 | (1) | (−) |
| 20 | 5.0 | 29 | ca. 10 | (1) | (−) |
| 21 | 10 | 70 | | 132–136 | (−) |
| 22 | 15 | 99 | | 137–139 | (−) |

HCX-p=hexachloro-para-xylene.
[1] Not determined.

Table III shows that 15 percent of zinc chloride based upon the weight of the hexachloro-para-xylene gave an excellent result. There are no indications that amounts of catalyst clearly in exces of 15 percent based by weight on the hexachloro-para-xylene would not work well, but there is evidence that 15 percent does a fine job and that much more would usually be uneconomical.

SERIES 4

The reaction of methanol with hexachloro-para-xylene in the presence of zinc chloride was extended to include higher alcohols. The procedure of Series 1 was generally followed. Examples 23 to 26 shown in Table IV below show the effect of using representative monohydric aliphatic alcohols up to and including 6 carbon atoms. The melting points of the chemically pure diesters of terephthalic acid appearing in Table IV are: diethyl terephthalate 42°–44° C. (Beilstein 9, 844); dipropylterephthalate 29.5 ° C. (Beilstein 9, 374); diisobutylterephthalate 55° C. (Beinstein 9, 844); dihexyl terephthalate 37° C. (Annalen der chemie, Liebig 517, 54–66).

TABLE IV.—ALCOHOLS VARIED UP TO C$_6$

| Example | Alcohol | Moles alcohol/ Mole xylene | ZnCl$_2$ Catalyst, Wt. Percent | Diester | | | Alkyl Chloride, Percent Yield | Reaction Time, Hours |
|---|---|---|---|---|---|---|---|---|
| | | | | Percent Yield | M.P., °C. | B.P., °C./2 mm. abs. pres. | | |
| 23 | Ethyl | 12 | 10 | 98.6 | 42–44 | 130 | 48.4 | 90 |
| 24 | n-Propyl | 11.9 | 15 | 96.3 | (1) | 135–137 | 52.2 | 48 |
| 25 | Isobutyl | 11.8 | 15 | 59.6 | 55–56 | (1) | (1) | 60 |
| 26 | n-Hexyl | 12.1 | 15 | 88 | 34.5–36 | 205–210 | 52.9 | 18 |

[1] Not determined.
Percents are based upon the weight of hexachloro-para-xylene.

An examination of Table IV reveals that substantially stoichiometric quantitative yields were obtained when ethyl and normal propyl alcohols were used, as were obtained when methanol was used. The C$_4$ and C$_6$ alcohols tended to give some side reactions.

Higher alcohols such as octyl and dodecyl can be made to react, but by-products are usually formed in considerable amounts along with the diester.

All aliphatic primary alcohols having from 1 to 6 carbon atoms, both saturated and unsaturated, react with hexachloro-para-xylene according to our invention to produce the corresponding dialkyl terephthalate.

Having thus described our invention, what we claim and desire to protect by Letters Patent is:

1. The method of making a diester of terephthalic acid which comprises reacting a mixture of α,α,α,α',α',α'-hexachloro-para-xylene and a monohydric aliphatic primary alcohol having 1 to 6 carbon atoms in a molar ratio of 9 to 30 moles of the alcohol per mole of the said hexachloro-para-xylene, in admixture with from 10 to 30 percent by weight based upon said hexachloro-para-xylene, of a Friedel-Crafts catalyst selected from the group consisting of sulfuric acid, aromatic sulfonic acids, and chlorides and bromides of zinc, iron, mercury, cadmium, cobalt, tin and nickel, by heating said mixture under reflux at a temperature between 60° and 145° C.

2. The method of making a diester of terephthalic acid which comprises reacting a mixture of α,α,α,α',α',α'-hexachloro-para-xylene and a monohydric aliphatic primary alcohol having 1 to 6 carbon atoms in a molar ratio of 9 to 30 moles of the alcohol to 1 mole of said hexachloro-para-xylene, in admixture with from 10 to 30 percent by weight of a Friedel-Crafts catalyst based upon the weight of said hexachloro-para-xylene, by heating said mixture at between 60° and 145° C. until the reaction is substantially complete.

3. The method of making a diester of terephthalic acid and an alkyl chloride which comprises reacting a mixture of α,α,α,α',α',α'-hexachloro-para-xylene and a monohydric aliphatic primary alcohol having 1 to 6 carbon atoms, in the molar ratio of 9 to 30 moles of the alcohol to 1 mole of the hexachloro-para-xylene in admixture with from 10 to 30 percent by weight of a Friedel-Crafts catalyst based upon the weight of said hexachloro-para-xylene, by heating said mixture at between 60° and 145° C. until substantially stoichiometric quantities of the diester and the alkyl halide have been produced, and recovering said diester and alkyl chloride in substantially pure form.

4. The method of claim 3 wherein the primary alcohol is methanol.

5. The method of claim 3 wherein the primary alcohol is ethanol.

6. The method of claim 3 wherein the primary alcohol is n-propanol.

7. The method of claim 3 wherein the primary alcohol is n-butanol.

8. The method of claim 1 wherein the Friedel-Crafts catalyst is zinc chloride.

References Cited in the file of this patent

UNITED STATES PATENTS 2,610,211　　Darragh et al. _____ Sept. 9, 1952

FOREIGN PATENTS 11,494　　Germany _____ Dec. 7, 1879
472,422　　Germany _____ Feb. 28, 1929
1,078,832　　France _____ May 12, 1954

OTHER REFERENCES

Richter: "Textbook of Organic Chemistry," p. 485, J. Wiley, 1952.

Wagner et al.: "Synthetic Organic Chemistry," pp. 483–484, J. Wiley, 1953.

Ind. and Eng. Chem., 47, pt. II, No. 9, p. 1852 (1955).